United States Patent
Lim et al.

(10) Patent No.: US 9,346,014 B2
(45) Date of Patent: May 24, 2016

(54) EXHAUST GAS AFTER-TREATMENT APPARATUS HAVING IMPROVED DURABILITY AND EXHAUST GAS AFTER-TREATMENT METHOD

(71) Applicant: DOOSAN INFRACORE CO., LTD., Incheon (KR)

(72) Inventors: Ji Hoon Lim, Seoul (KR); Min Seok Ko, Gyeonggi-do (KR); Byoung Gul Oh, Gyeonggi-do (KR); Kyung Min Park, Gyeonggi-do (KR); Sang Hoon Kim, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 16 days.

(21) Appl. No.: 14/369,578

(22) PCT Filed: Dec. 17, 2012

(86) PCT No.: PCT/KR2012/010984
§ 371 (c)(1),
(2) Date: Jun. 27, 2014

(87) PCT Pub. No.: WO2013/100460
PCT Pub. Date: Apr. 7, 2013

(65) Prior Publication Data
US 2015/0004085 A1    Jan. 1, 2015

(30) Foreign Application Priority Data

Dec. 27, 2011  (KR) .................... 10-2011-0143279

(51) Int. Cl.
*B01D 53/86* (2006.01)
*F01N 3/10* (2006.01)
(Continued)

(52) U.S. Cl.
CPC .......... *B01D 53/8631* (2013.01); *B01D 53/869* (2013.01); *B01D 53/8696* (2013.01);
(Continued)

(58) Field of Classification Search
None
See application file for complete search history.

(56) References Cited

U.S. PATENT DOCUMENTS

| | | | |
|---|---|---|---|
| 2008/0155968 A1* | 7/2008 | Salemme | F01N 3/035 60/288 |
| 2011/0265452 A1* | 11/2011 | Geveci | F01N 3/208 60/274 |

FOREIGN PATENT DOCUMENTS

| | | |
|---|---|---|
| DE | 10-2008-032332 A1 | 8/2009 |
| EP | 1722078 A1 | 11/2006 |
| EP | 2163742 A1 | 3/2010 |
| JP | 2002-531745 | 9/2002 |
| JP | 2006-046288 | 2/2006 |
| JP | 2006-207512 | 8/2006 |

(Continued)

OTHER PUBLICATIONS

Search Report dated Mar. 27, 2013 and written in Korean with English translation for International Patent Application No. PCT/KR2012/010984 filed Dec. 17, 2012, 5 pages.

(Continued)

*Primary Examiner* — Melvin C Mayes
*Assistant Examiner* — Sheng H Davis
(74) *Attorney, Agent, or Firm* — John D. Veldhuis-Kroeze; Westman, Champlin & Koehler, P.A.

(57) ABSTRACT

The present disclosure relates to an exhaust gas after-treatment apparatus and an exhaust gas after-treatment method including a selective catalytic reduction (SCR) process, and more particularly, to an exhaust gas after-treatment apparatus having improved durability and an exhaust gas after-treatment method, which selectively determine to operate a selective catalyst reducing part and an ammonia oxidation catalyst (AOC) part on the basis of a generated amount and a rate of change of a nitrogen compound (NOx) in exhaust gas.

2 Claims, 3 Drawing Sheets

(51) Int. Cl.
  *F01N 3/20* (2006.01)
  *F01N 3/023* (2006.01)
  *B01D 53/94* (2006.01)
  *F01N 11/00* (2006.01)

(52) U.S. Cl.
  CPC ........ B01D53/9477 (2013.01); B01D 53/9495 (2013.01); F01N 3/0231 (2013.01); F01N 3/106 (2013.01); F01N 3/2053 (2013.01); F01N 3/2066 (2013.01); *B01D 53/944* (2013.01); *B01D 53/9418* (2013.01); *B01D 53/9436* (2013.01); *F01N 11/00* (2013.01); *F01N 2550/02* (2013.01); *F01N 2560/026* (2013.01); *F01N 2560/14* (2013.01); *F01N 2570/18* (2013.01); *F01N 2610/02* (2013.01); *Y02T 10/24* (2013.01)

(56) References Cited

FOREIGN PATENT DOCUMENTS

| JP | 2007-100508 | | 4/2007 |
| WO | 2008135805 | * | 11/2008 |
| WO | 2010/032738 A1 | | 3/2010 |
| WO | 2010/101570 A1 | | 9/2010 |

OTHER PUBLICATIONS

European Search Report mailed Jul. 20, 2015 for European Application No. 12861341.1, 5 pages.

Chinese Office Action dated Oct. 29, 2015 for Chinese Application No. 201280065220.1, 6 pages.

* cited by examiner

EXHAUST GAS AFTER-TREATMENT APPARATUS HAVING IMPROVED DURABILITY AND EXHAUST GAS AFTER-TREATMENT METHOD

CROSS-REFERENCE TO RELATED APPLICATION

This Application is a Section 371 National Stage Application of International Application No. PCT/KR2012/010984, filed Dec. 17, 2012 and published, not in English, as WO 2013/100460 on Jul. 4, 2013.

FIELD OF THE DISCLOSURE

The present disclosure relates to an exhaust gas after-treatment apparatus and an exhaust gas after-treatment method including a selective catalytic reduction (SCR) process, and more particularly, to an exhaust gas after-treatment apparatus having improved durability and an exhaust gas after-treatment method, which selectively determine to operate a selective catalyst reducing part and an ammonia oxidation catalyst (AOC) part on the basis of a generated amount and a rate of change of a nitrogen compound (NOx) in exhaust gas.

BACKGROUND OF THE DISCLOSURE

FIG. 1 is a configuration diagram of an exhaust gas after-treatment apparatus in the related art. In general, as illustrated in FIG. 1, an after-treatment apparatus for exhaust gas generated in a diesel vehicle includes an exhaust gas oxidation catalyst part 10, an exhaust gas filtering part 20, a selective catalyst reducing part 30, an ammonia oxidation catalyst part 40, and the like that are disposed in this order.

Here, a dosing valve 31 is connected to a front side of a selective catalyst reducing part 30.

In the after-treatment apparatus and a process of using the after-treatment apparatus in the related art, the nitrogen compound reaches the selective catalyst reducing part 30 while the exhaust gas passes through the exhaust gas oxidation catalyst part 10 and the exhaust gas filtering part 20.

In this case, the after-treatment apparatus in the related art has a manner in which the exhaust gas enters the selective catalyst reducing part 30 regardless of a generated amount of the nitrogen compound. That is, there is a problem in that there is no structure which may control an inflow of gas into the selective catalyst reducing part 30 and an operation of the selective catalyst reducing part 30 on the basis of the generated amount of the nitrogen compound.

Accordingly, the selective catalyst reducing part 30 is continuously operated regardless of the generated amount of nitrogen compound even if the generated amount of nitrogen compound is small or there is no nitrogen compound, which causes a problem with deterioration in durability.

In addition, a location to which the nitrogen compound passing through the selective catalyst reducing part 30 flows is the ammonia oxidation catalyst part 40. The ammonia oxidation catalyst part 40 is a location where the ammonia is input and reacts with the nitrogen compound.

Even in this case, the ammonia oxidation catalyst part 40 is operated regardless of a rate of change of the nitrogen compound such that a problem with durability may occur, and this problem occurs because no detecting and calculating means, which may detect the nitrogen compound, is provided at a front side of the ammonia oxidation catalyst part 40.

Therefore, it is urgently needed to develop an apparatus having a structure in which determination to operate the selective catalyst reducing part 30 and the ammonia oxidation catalyst part 40 is performed on the basis of the generated amount or the rate of change of nitrogen compound.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Accordingly, the present disclosure has been made in consideration of the aforementioned problem in the related art, and an object of the present disclosure is to provide an exhaust gas after-treatment apparatus having improved durability and an exhaust gas after-treatment method in which a detection means and a bypass valve are mounted at front sides of a selective catalyst reducing part and an ammonia oxidation catalyst part so that determination to operate the selective catalyst reducing part and the ammonia oxidation catalyst part may be selectively performed on the basis of a generated amount and a rate of change of nitrogen compound.

The aforementioned object of the present disclosure is achieved by an exhaust gas after-treatment apparatus having improved durability, which includes an exhaust gas oxidation catalyst part which oxidizes exhaust gas; an exhaust gas filtering part which is connected to the exhaust gas oxidation catalyst part, and filters the exhaust gas; a selective catalyst reducing part which is connected to the exhaust gas filtering part; and an ammonia oxidation catalyst part which is connected to the selective catalyst reducing part, in which a first gas detection sensor for detecting a generated amount of nitrogen compound in the exhaust gas flowing from the exhaust gas filtering part, and a selective catalyst reducing bypass valve for selectively blocking the exhaust gas from flowing into the selective catalyst reducing part are installed at a front side of the selective catalyst reducing part, and the exhaust gas after-treatment apparatus includes a control part which is electrically connected so as to control whether to operate the selective catalyst reducing bypass valve and the selective catalyst reducing part on the basis of a gas amount detection signal.

Here, a second gas detection sensor for detecting nitrogen compound gas, and an ammonia oxidation catalyst bypass valve for selectively blocking the exhaust gas from flowing into the ammonia oxidation catalyst part may be further electrically connected and installed to the control part at a front side of the ammonia oxidation catalyst part.

Meanwhile, the aforementioned object of the present disclosure is achieved by an exhaust gas after-treatment method including: detecting, by a first gas detection sensor, a nitrogen compound from exhaust gas passing through an exhaust gas oxidation catalyst part and an exhaust gas filtering part (S100); determining, by a control part, to open and close a selective catalyst reducing bypass valve on the basis of a detection signal (S200); detecting, by a second gas detection sensor, nitrogen compound gas passing through the selective catalyst reducing part (S300); and determining to open and close an ammonia oxidation catalyst bypass valve depending on a calculation of a rate of change of the nitrogen compound of the control part on the basis of the detection signal (S400).

According to the exhaust gas after-treatment apparatus having improved durability according to the present disclosure, when a generated amount of nitrogen compound is detected before the exhaust gas flows into the selective catalyst reducing part, and is smaller than a reference value, it is possible to remarkably improve durability of the selective catalyst reducing part by discharging the exhaust gas without allowing the exhaust gas to flow into the selective catalyst reducing part.

In addition, a structure for measuring a rate of change of the nitrogen compound is provided, and thus an inflow of the exhaust gas into the ammonia oxidation catalyst part may be selectively opened and closed, thereby improving durability of the ammonia oxidation catalyst part.

Other problems, specific advantages and novel features of the present disclosure will be more clearer through the following detailed description and preferred exemplary embodiments associated with the accompanying drawings.

DESCRIPTION OF MAIN REFERENCE NUMERALS OF DRAWINGS

Figure 1:
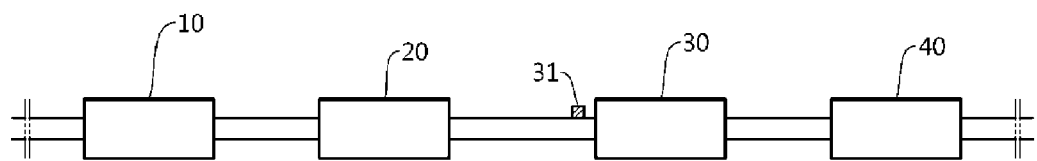
FIG. 1 is a configuration diagram of an exhaust gas after-treatment apparatus in the related art.

10: Exhaust gas oxidation catalyst part
20: Exhaust gas filtering part
30: Selective catalyst reducing part
31: Dosing valve
40: Ammonia oxidation catalyst part
100: Exhaust gas oxidation catalyst part
200: Exhaust gas filtering part
300: Selective catalyst reducing part
310: Dosing valve
320: First gas detection sensor
330: Selective catalyst reducing bypass valve
400: Ammonia oxidation catalyst part
410: Ammonia oxidation catalyst bypass valve
420: Second gas detection sensor
500: Control part

DETAILED DESCRIPTION

Hereinafter, an exhaust gas after-treatment apparatus having improved durability according to the present disclosure will be described with reference to the accompanying drawings.

Figure 2:
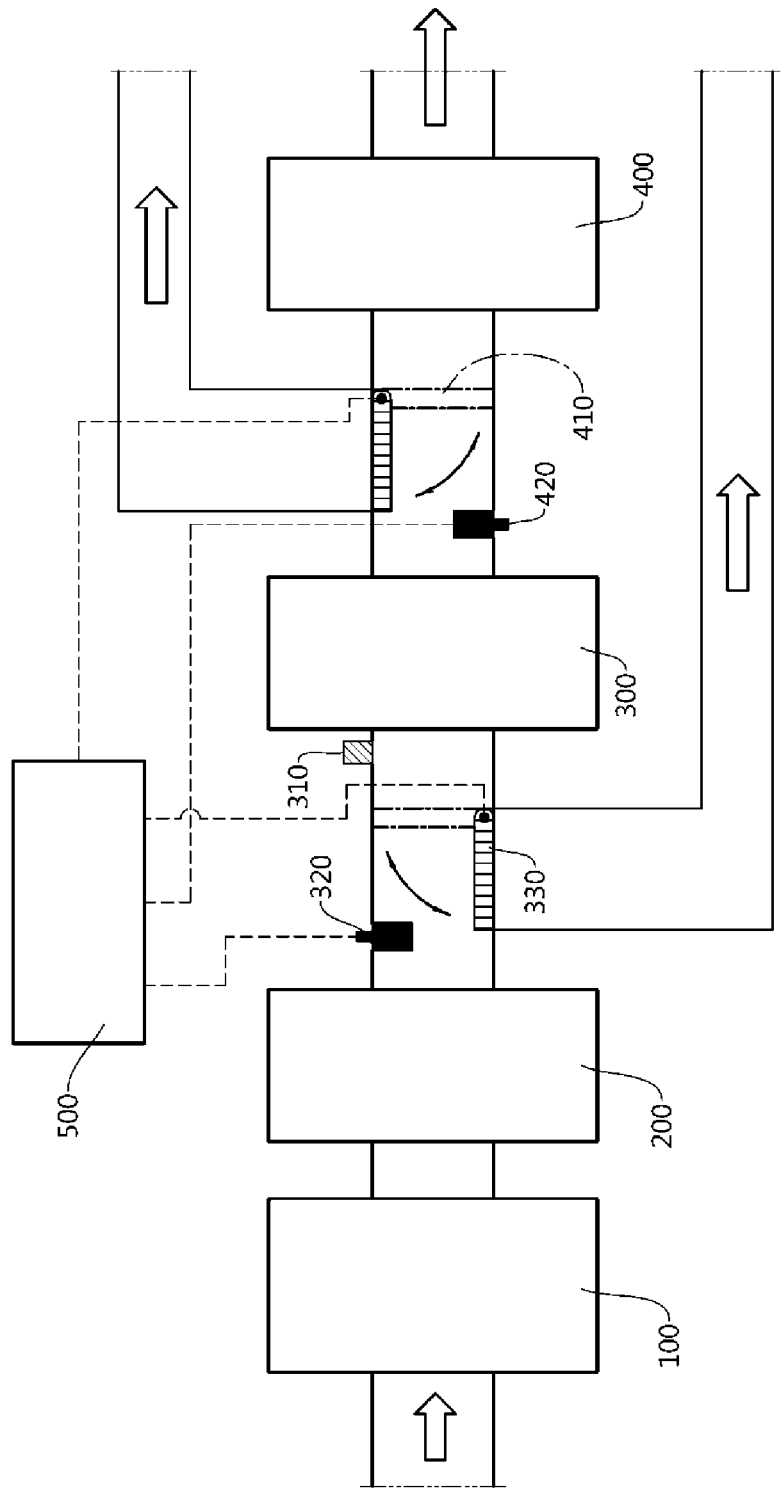
FIG. 2 is a configuration diagram of an exhaust gas after-treatment apparatus having improved durability according to the present disclosure.

FIG. 2 is a configuration diagram of an exhaust gas after-treatment apparatus having improved durability according to the present disclosure. As illustrated in FIG. 2, an exhaust gas after-treatment apparatus having improved durability according to the present disclosure serves to after-treat and discharge exhaust gas of a vehicle, and particularly, includes: gas detection sensors 320 and 420 and bypass valves 330 and 410 which are provided to adjust an inflow of the exhaust gas into a selective catalyst reducing part 300 and an ammonia oxidation catalyst part 400 on the basis of a generated amount and a rate of change of a nitrogen compound; and a control part 500 which controls the gas detection sensors 320 and 420 and the bypass valves 330 and 410.

The exhaust gas after-treatment apparatus according to the present disclosure includes an exhaust gas oxidation catalyst part 100 which oxidizes the exhaust gas, and an exhaust gas filtering part 200 which is connected to the exhaust gas oxidation catalyst part 100 and filters the exhaust gas, a selective catalyst reducing part 300 which is connected to the exhaust gas filtering part 200, and has a dosing valve 310 installed at a front side of the selective catalyst reducing part 300, and an ammonia oxidation catalyst part 400 which is connected to the selective catalyst reducing part 300.

Here, the exhaust gas passing through the exhaust gas oxidation catalyst part 100 and the exhaust gas filtering part 200 flows into the selective catalyst reducing part 300, and when a nitrogen compound is generated from the exhaust gas, the nitrogen compound is decomposed while passing through the selective catalyst reducing part 300, and when a small amount of nitrogen compound is generated or no nitrogen compound is generated, the process in which the exhaust gas flows into the selective catalyst reducing part 300 and the nitrogen compound is decomposed is not necessary.

In the after-treatment apparatus according to the present disclosure, a structure, which detects a generated amount of nitrogen compound and discharges the nitrogen compound to the outside when the generated amount is smaller than a reference value, is provided at the front side of the selective catalyst reducing part 300, and the structure has a first gas detection sensor 320 and a selective catalyst reducing bypass valve 330.

In addition, a control part 500 is electrically connected to the first gas detection sensor 320 and the selective catalyst reducing bypass valve 330, and the reference value regarding the generated amount of nitrogen compound is stored in the control part 500.

The control part 500 has an ECU logic calculation structure which determines to open and close the selective catalyst reducing bypass valve 330 through a comparative calculation with the reference value.

Therefore, in a case in which the first gas detection sensor 320 detects the nitrogen compound, and sends the detection signal to the control part 500, the control part 500 performs the comparative calculation with the stored reference value, and when the generated amount is greater than the reference value, commands the selective catalyst reducing bypass valve 330 to be opened so as to control the corresponding nitrogen compound to pass through the selective catalyst reducing part 300.

On the contrary, when the generated amount is the reference value or less, the control part 500 commands the selective catalyst reducing bypass valve 330 to be closed so as to allow the corresponding nitrogen compound to be discharged into the atmosphere, such that it is possible to provide a structure which determines to open and close the selective catalyst reducing bypass valve 330 and to allow the nitrogen compound to flow into the selective catalyst reducing part 300 on the basis of the generated amount of nitrogen compound.

In addition, the ammonia oxidation catalyst part 400 is connected to a rear side of the selective catalyst reducing part 300. A second gas detection sensor 420 and an ammonia oxidation catalyst bypass valve 410 are installed at a front side of the ammonia oxidation catalyst part 400.

The second gas detection sensor 420 and the ammonia oxidation catalyst bypass valve 410 are structures that are provided so that determination to allow the nitrogen compound to flow into the ammonia oxidation catalyst part 400 is performed depending on a rate of change of the nitrogen compound, and both the second gas detection sensor 420 and the ammonia oxidation catalyst bypass valve 410 are electrically connected to the control part 500.

In this case, the control part 500 stores a reference value regarding the rate of change of the nitrogen compound, and may have a structure, which determines to open and close the ammonia oxidation catalyst bypass valve 410 and to allow the nitrogen compound to flow into the ammonia oxidation catalyst part 400 depending on percentage calculation processing in which values after and before a change of the nitrogen compound are divided by a value before the change of the nitrogen compound, and depending on a comparative calculation with the reference value.

In this case, factor variables, which are multiplied depending on a temperature of an engine and atmospheric pressure in order to correct a result of the calculation processing, may be used to perform the calculation of the control part 500, and relevant optimal values may be obtained by reflecting test result values.

Therefore, in a case in which the nitrogen compound flows into the ammonia oxidation catalyst part 400, the nitrogen compound as corresponding nitrogen compound gas is detected by the second gas detection sensor 420, and the detection signal is sent to the control part 500.

Then, through the aforementioned calculation processing and the comparison with the reference value on the basis of the detection signal, in a case in which the generated amount of nitrogen compound is greater than the reference value, the control part 500 opens the ammonia oxidation catalyst bypass valve 410 so that the nitrogen compound flows into the ammonia oxidation catalyst part 400 and then is decomposed, and in a case in which the generated amount of nitrogen compound is the reference value or less, the control part 500 commands the ammonia oxidation catalyst bypass valve 410 to be closed so that the nitrogen compound, which has an amount equal to or smaller than the reference value, is discharged into the atmosphere, such that it is possible to implement a structure in which determination to allow the nitrogen compound to flow into the ammonia oxidation catalyst part 400 may be performed by the comparison with the reference value set to the control part.

Figure 3:
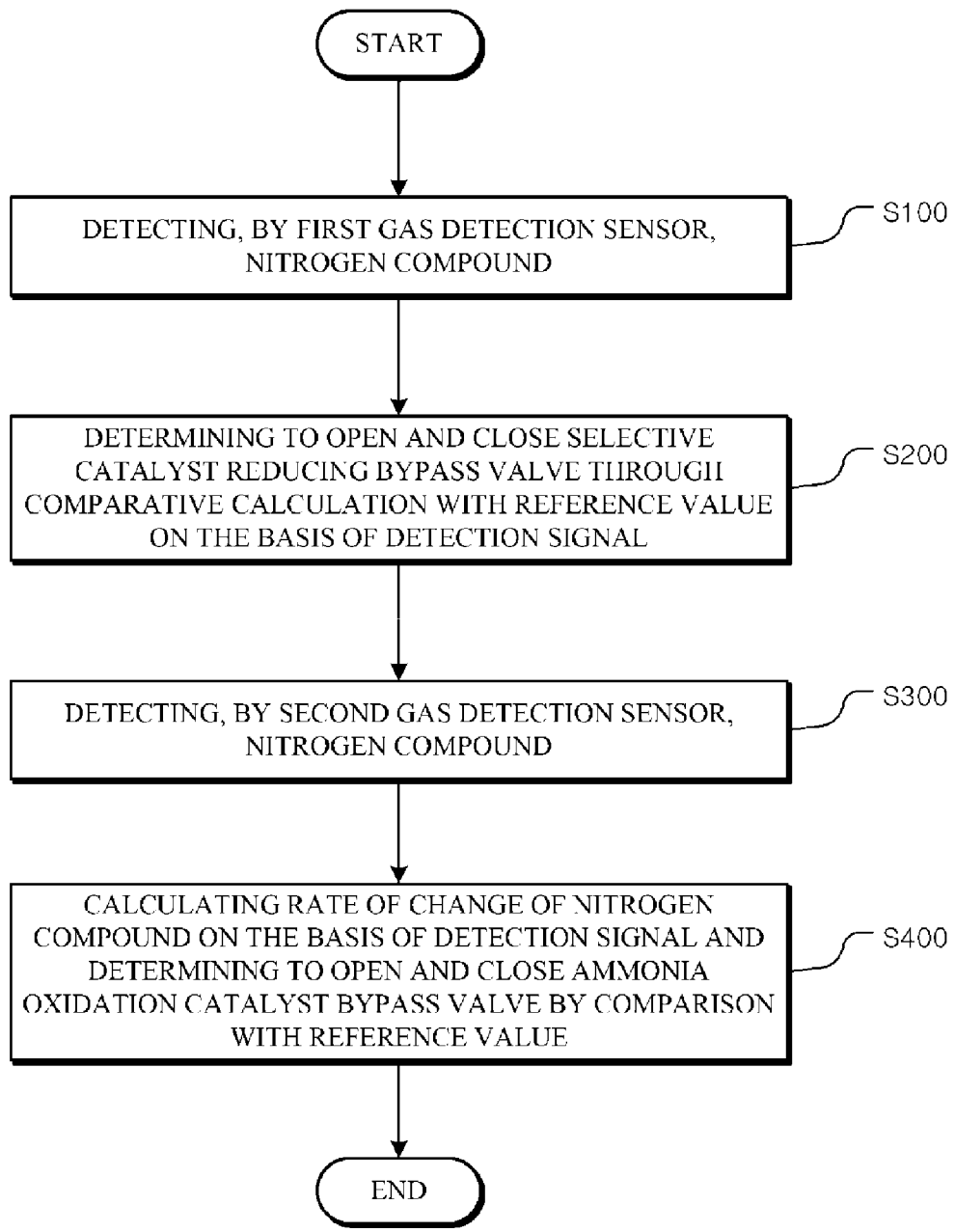
FIG. 3 is a flowchart regarding an exhaust gas after-treatment method according to the present disclosure.

FIG. 3 is a flowchart regarding an exhaust gas after-treatment method according to the present disclosure. As illustrated in FIG. 3, an exhaust gas after-treatment method of the present disclosure is a process which is configured to perform selective catalytic reduction and an operation of an ammonia oxidation catalyst on the basis of the generated amount and the rate of change of the nitrogen compound generated in the exhaust gas.

First, the generated amount of exhaust gas nitrogen compound is detected before the exhaust gas discharged from the vehicle flows into the selective catalyst reducing part 300 from the exhaust gas oxidation catalyst part 100 and the exhaust gas filtering part 200 (S100).

In this case, the generated amount of nitrogen compound is detected by the first gas detection sensor 320 installed at the front side of the selective catalyst reducing part 300.

Next, the control part 500 performs comparative calculation processing with the reference value on the basis of the detection signal of the nitrogen compound, and determines to open and close the selective catalyst reducing bypass valve 330 with respect to the selective catalyst reducing part 300 depending on the corresponding result.

The control part 500 compares the detection signal of the first gas detection sensor 320 with the stored reference value, and opens the selective catalyst reducing bypass valve 330 when the detection signal is greater than the reference value, so as to allow the corresponding nitrogen compound to flow into the selective catalyst reducing part 300.

On the contrary, when the corresponding detection signal is the reference value or less, the control part 500 closes the selective catalyst reducing bypass valve 330 so as to allow the nitrogen compound to be discharged into the atmosphere (S200).

In a next step of detecting an inflow of nitrogen compound gas when the nitrogen compound gas of the selective catalyst reducing part 300 flows into the ammonia oxidation catalyst part 400, the second gas detection sensor 420 detects the nitrogen compound gas passing through the selective catalyst reducing part 300, and sends the corresponding detection signal to the control part 500.

The second gas detection sensor 420 is installed at the front side of the ammonia oxidation catalyst part 400 together with the ammonia oxidation catalyst bypass valve 410.

Therefore, in a case in which the nitrogen compound reaches the ammonia oxidation catalyst part 400, the nitrogen compound gas may be detected by the second gas detection sensor 420 (S300)

In this case, the control part 500 has an ECU logic manner and stores a calculation formula of (a value before change−a value after change)/a value before change×100 together with the reference value regarding a rate of change, and a temperature of the engine and the atmospheric pressure at the corresponding time as corrected values, and a next step is a step of measuring the rate of change of the corresponding nitrogen compound on the basis of the detection signal of the second gas detection sensor 420, and determining to open and close the ammonia oxidation catalyst bypass valve 410 by comparing the detection signal with the reference value.

The control part 500 stores the reference value regarding the rate of change of the nitrogen compound, and compares the calculated rate of change and the reference value on the basis of the corresponding detection signal. In this case, when the rate of change is higher than the reference value, the control part 500 commands the ammonia oxidation catalyst bypass valve 410 to be opened so as to allow the corresponding nitrogen compound to flow into the ammonia oxidation catalyst part 410, and when the rate of change is the reference value or less, the control part 500 commands the ammonia oxidation catalyst bypass valve 410 to be closed to allow the nitrogen compound to be discharged into the atmosphere (S400).

According to the processes of the after-treatment method according to the present disclosure, it is possible to determine to perform a selective catalyst reducing reaction or an ammonia oxidation catalyst reaction of the nitrogen compound on the basis of the generated amount and the rate of change of the nitrogen compound.

The present disclosure may be used to purify nitrogen oxide included in exhaust gas using selective catalytic reduction (SCR).

Although the present disclosure has been described with reference to exemplary and preferred embodiments, workers skilled in the art will recognize that changes may be made in form and detail without departing from the spirit and scope of the disclosure.

What is claimed is:

1. An exhaust gas after-treatment apparatus having improved durability, comprising:
   an exhaust gas oxidation catalyst part which oxidizes exhaust gas;
   an exhaust gas filtering part which is connected to the exhaust gas oxidation catalyst part, and filters the exhaust gas;

a selective catalyst reducing part which is connected to the exhaust gas filtering part; and an ammonia oxidation catalyst part which is connected to the selective catalyst reducing part, wherein a first gas detection sensor for detecting a generated amount of nitrogen compound in the exhaust gas flowing from the exhaust gas filtering part, and a selective catalyst reducing bypass valve for selectively blocking the exhaust gas from flowing into the selective catalyst reducing part are installed at a front side of the selective catalyst reducing part, and the exhaust gas after-treatment apparatus includes a control part which is electrically connected so as to control whether to operate the selective catalyst reducing bypass valve and the selective catalyst reducing part on the basis of a gas amount detection signal; and wherein a second gas detection sensor for detecting nitrogen compound gas, and an ammonia oxidation catalyst bypass valve for selectively blocking the exhaust gas from flowing into the ammonia oxidation catalyst part are further electrically connected and installed to the control part at a front side of the ammonia oxidation catalyst part.

2. An exhaust gas after-treatment method comprising:

detecting, by a first gas detection sensor, a nitrogen compound from exhaust gas passing through an exhaust gas oxidation catalyst part and an exhaust gas filtering part;

determining, by a control part, to open and close a selective catalyst reducing bypass valve with respect to a selective catalyst reducing part on the basis of a detection signal;

detecting, by a second gas detection sensor, nitrogen compound gas passing through the selective catalyst reducing bypass valve; and determining to open and close an ammonia oxidation catalyst bypass valve with respect to an ammonia oxidation catalyst part depending on a calculation of a rate of change of the nitrogen compound of the control part on the basis of the detection signal.

* * * * *